United States Patent Office 2,751,389
Patented June 19, 1956

2,751,389

PYRIDYL ALIPHATIC ALKYLENE POLYAMINE POLY ACID COMPOUNDS AND SALTS

Frederick C. Bersworth, Verona, N. J., assignor to The Dow Chemical Company, Midland, Mich., a corporation of Delaware No Drawing. Application July 13, 1953,
Serial No. 367,721

8 Claims. (Cl. 260—295)

This invention relates to chelating agents for metal ions in aqueous solutions and has for its object the provision of new type chelating agents.

Another object is to provide a pyridyl aliphatic alkylene polyamine poly acid chelating agent for metal ions in aqueous solutions.

Still another object is to provide a pyridyl polyamine poly acid chelating compound for metal ions in aqueous solutions.

Other objects will be apparent as the invention is more fully disclosed.

In accordance with these objects, I have discovered that by displacing one of the amino hydrogens of an aliphatic alkylene polyamine with an alkylene group in which group there is a pyridyl substituent group and the remaining amino hydrogens of the alkylene polyamine with acetic acid residues, propionic acid residues and their alkali metal salts, ammonium salts and their amine salts, the resultant alkylene polyamine poly acids are strong chelating agents for metal ions in aqueous solutions forming metal chelate compounds which are highly soluble, non-ionic with respect to the chelated metal, and extremely stable.

The new chelating compounds of the present invention fall generally under the structural formula:

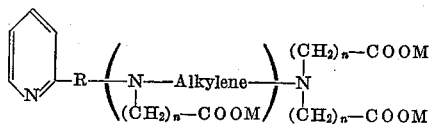

wherein R represents an alkylene radical of 1 to 12 carbon atoms in length which may or may not be substituted with low molecular weight monovalent alkyl radicals such as methyl and ethyl; Alkylene represents bivalent alkyl radicals containing 2–4 carbon atoms arranged structurally in such a manner as to interpose at least 2 and not more than 3 carbon atoms between the nitrogen atoms; $n$ is a positive integer and is either 1 or 2; M is a member of the group consisting of hydrogen, alkali metal, ammonium and substituted ammonium ions and $x$ is a positive integer and equals 1, 2, 3 and 4.

In this type of compound there are two functional groups, the pyridyl substituent group and the poly acid residues and their salts as substituent groups on the alkylene polyamine.

The chelating power of these mono-pyridyl substituted alkylene polyamine poly acids, their alkali metal salts, ammonium salts, and amine salts is markedly different from that of the disubstituted corresponding compounds (described in my copending application Serial No. 183,079, filed September 2, 1950.

I have discovered that by interposing an alkylene group in the R position between the pyridyl group and the amino nitrogen of the alkylene polyamine, the formation of chelate compounds between the pyridyl group and the adjacently substituted carboxylic group is effectively prevented and that as the number of carbon atoms in the R group increase the chemical reactivity of the pyridyl group becomes essentially independent of the adjacently substituted carboxylic group. This frees the carboxylic substituent groups of the polyamino poly acid for chelate formation and leaves one of the carboxylic groups free to act as a solubilizing group in the compound. Thus the pyridlyl group when R is large may be independently reacted to form pyridine substituted compounds such as quaternary ammonium compounds.

Referring to the structural formula, the steric considerations of the properties are as follows:

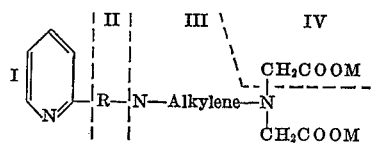

the section of the compound indicated to be I is made available for chemical reaction essentially as pyridine when II is a single carbon atom chain; III then is available for the formation of inner chelate rings with polyvalent metals M as follows:

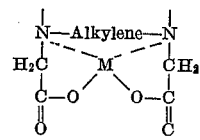

and the remaining acid or salt function noted as IV is available for rendering the compound soluble in water.

Of the large number of compounds within the scope of this disclosure, the most practical for purposes of illustration of the invention, but not as a limitation of the same, are those in which R is relatively small, such as methylene and propylene, and wherein the alkylene polyamine is a diamine, such as ethylene diamine or trimethylene diamine, or wherein the alkylene polyamine is a triamine, such as diethylene triamine.

In these new compounds, I have found that the chelating properties of the compound decrease as the carboxylic acid group is removed from the amino nitrogens by displacing acetic acid with one of its higher homologues in the fatty acid series and for the best results prefer to employ acetic acid substituent groups.

I have also found, in general, that ethylene diamine forms the most stable series of alkylene polyamine compounds particularly in hot aqueous solutions.

The compounds of the present invention have a great affinity for alkaline earth and rare earth metals and for a large number of other metal ions which are difficult to chelate, such as Pb, V, Zr and U.

In the following series of specific examples, it is to be noted in the isolation of the compound in pure form, advantage is taken of the general principle that these compounds, because of the manner in which the acid groups are distributed over the molecule, are relatively insoluble in water. Accordingly, recovery of the pure compound is usually most conveniently carried out by converting it to the acid form to crystallize the compound. For this purpose, mineral acids, such as hydrochloric or sulfuric may be used. Conversion to the salt is accomplished by dissolving the acid form of the compound in an aqueous medium containing the appropriate alkali metal base, ammonia, or amine and drying the thus formed salt.

As typical examples of the preferred type of compound, but not as a limitation of the invention to these preferred types the following examples are disclosed:

Example I

One mole of 2-chloromethyl pyridine was treated with 5 moles of ethylene diamine. It was found best to add the halide slowly to the rapidly-stirred ethylene diamine with cooling, followed by heating to an elevated temperature in the vicinity of about 100° C. After two hours of heating the excess ethylene diamine was removed by distillation. One mole of aqueous caustic soda was then added cautiously, with stirring, and any precipitated sodium chloride removed by filtration. The resulting monosubstituted ethylene diamine may be purified by distillation or used directly for further reaction. It is treated with three moles of formaldehyde and three moles of sodium cyanide (according to the process described in my U. S. Patent No. 2,407,645). The reaction product may be obtained in crystalline acid form from this reaction solution on acidification with mineral acid, such as hydrochloric acid, sulfuric acid, and is believed to have the following formula:

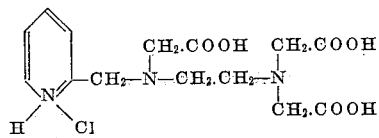

The compound as it will be noted is synthesized as its sodium salt in strongly alkaline medium and, accordingly, can be recovered as such. However, because the acid form is relatively insoluble in water, recovery of the pure compound is accomplished by converting to the acid. When recovered in its acid form from acid medium the compound is obtained as its acid addition compound. The alkali metal salts are formed by dissolving the compound in aqueous alkali solution and recrystallizing the corresponding alkali metal salts. On this basis the sodium, potassium, lithium, rubidium, cesium, ammonium and the simple amine salts are formed.

*Example II*

The procedure is the same as in Example I with the exception that diethylene triamine is used in place of ethylene diamine and the intermediate substituted diethylene triamine is treated without purification with four moles of NaCN in 500 milliliters of water and four moles of CH₂O. The acid product is believed to have the structure:

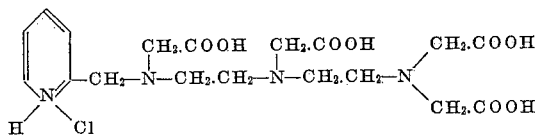

The compound as it will be noted is synthesized as its sodium salt in strongly alkaline medium and, accordingly, can be recovered as such by evaporation. However, because the acid form is relatively insoluble in water, recovery of the pure compound is accomplished by converting to the acid form. The alkali metal salts are formed by dissolving the compound in aqueous alkali solution and recrystallizing the corresponding alkali metal salts. On this basis, the sodium, potassium, lithium, rubidium, cesium, ammonium and the simple amine salts are formed.

*Example III*

One mole pyridine 2-aldehyde is treated with 5 moles of trimethylene diamine, first at room temperature and then at about 50° C. for one hour. The reaction may be carried out without solvent, but may be more easily controlled with an inert solvent. The resulting Schiff base obtained after vacuum distillation of excess trimethylene diamine is then carefully hydrogenated with a promoted nickel catalyst until one mole of H₂ is absorbed. The resulting product is the monosubstituted trimethylene diamine, colored blue-green because of contamination with a small amount of nickel complex salt; this is removed by treatment with hydrogen sulfide, heating to about 100°, and filtering. The product may be then purified by distillation or treated directly with three moles of NaCN in 500 milliliters of water and three moles of CH₂O by the process described in my U. S. Patent No. 2,407,645, to give, after subsequent acidification with HCl, a crystalline acid which is believed to have the formula:

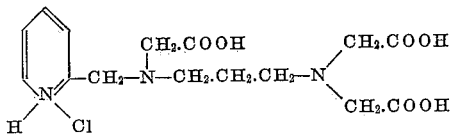

The compound as it will be noted is synthesized in strongly alkaline medium and, accordingly, is formed as the sodium salt which can be recovered directly as such. However, because the acid form is relatively insoluble in water, recovery of the pure compound is accomplished by converting to the acid. The alkali metal salts may be formed by dissolving the compound in aqueous alkali solution and recrystallizing the corresponding alkali metal salts. On this basis sodium, potassium, lithium, rubidium, cesium, ammonium and the simple amine salts are formed.

*Example IV*

One mole of 2-acetyl pyridine is treated exactly as described in Example III with the exception that the formation of the Schiff base is allowed to proceed with ethylene diamine for about 4 hours at 50° C. On acidification of the final reaction product with hydrochloric acid, a crystalline acid product was isolated which was believed to have the following formula:

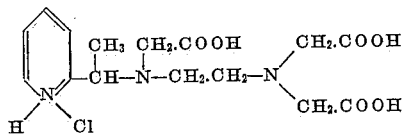

Alkali metal salts, ammonium salts and amine salts of the compounds are formed as indicated in the previous examples.

It is to be noted from the several examples that the acid forms of the compounds, their partial salts or completely neutral salts may be prepared. To form the fully neutral salt sufficient alkali (whether alkali metal base or ammonium base) must be used to neutralize all of the acid functions of the compound. In Example I three acetic acid functions and one HCl are shown. Hence, four moles of base would be needed per mole of compound to form the neutral salt. The mono acid salt would be formed by neutralization of the HCl and two of the acetic acid groups. In Example II, five moles of base would be needed for the four acetic acid groups and the one HCl; in Examples III and IV four moles of base would be needed for the neutral salt. The preparation of the salt is carried out as a common acid-base titration and inflections in the acid-base titration curves identify the formation of the mono, di, tri etc. salts. Isolation of the salts calls merely for recrystallization.

In the examples the synthesis is illustrated with ethylene, —CH₂CH₂—, and trimethylene, —CH₂CH₂CH₂—, amine derivatives, but it is to be understood that the manipulations and reactions are equally applicable to substituted ethylene and trimethylene, e. g.

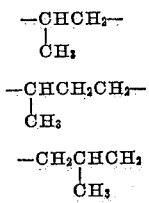

As an example of the nature of the chelating reactions that occur with various metals, several formulae of chelates using the chelating agent of Example I are given:

With $Cu^{+2}$—

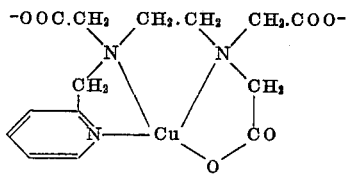

With $Ni^{+2}$—

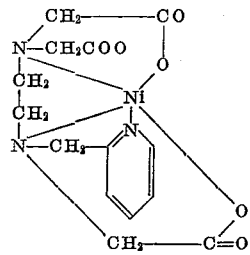

With $Ca^{+2}$—

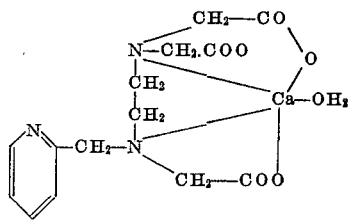

When R represents alkylene chains of 1 to 2 carbon atoms chelate formation as pictured for Cu and Ni is possible since 5 and 5 membered rings are formed. For values of R greater than —$CH_2$—$CH_2$—, chelate formation as depicted is not possible; the acid groups will become involved as is shown for the Ca chelate.

For elements such as Cu and Ni which prefer N to $O^-$, the pyridyl group will be involved in chelate formation when R represents a methylene or ethylene group; for elements such as Ca which prefer $O^-$ to N, the acid groups will be involved in chelate formation for all values of R.

All these chelates are formed in aqueous solution and are so slightly dissociated that the metal is effectively sequestered and prevented from undergoing normal ionic reactions.

Having hereinabove described the invention generically and specifically and given several specific examples thereof, it is believed apparent that the same may be widely varied and modified without essential departure therefrom and all such modifications and departures are contemplated as may fall within the scope of the following claims.

This application is a continuation in part of my application Serial No. 183,076, filed September 2, 1950, and now abandoned.

What is claimed is:

1. Compounds selected from the group consisting of those corresponding to the following general formula and acid addition salts of acid forms of said compounds:

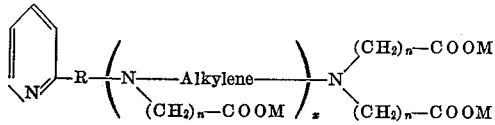

wherein Alkylene is a lower molecular weight bivalent alkylene group which places 2 to 3 carbon atoms in the chain directly between the indicated nitrogen atoms, R is an alkylene radical of 1 to 12 carbon atoms in length, $n$ is a positive integer having a value in the range 1 to 2, $x$ is a positive integer having a value in the range 1 to 4, M is selected from the group consisting of H, Na, K, Li, Ce, Rb, $NH_4$ and ammonium bases.

2. Compounds in accordance with claim 1 wherein Alkylene is —$CH_2.CH_2$— and M is hydrogen.

3. Compounds in accordance with claim 1 wherein Alkylene is —$CH_2.CH_2.CH_2$— and M is hydrogen.

4. A pyridyl alkylene polyamine poly acid compound having the following structure:

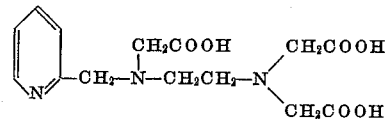

5. A pyridyl alkylene polyamine poly acid compound having the following structure:

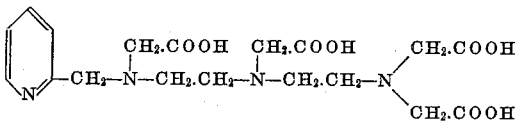

6. A pyridyl alkylene polyamine poly acid compound having the following structure:

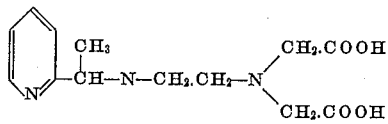

7. A pyridyl alkylene polyamine poly acid compound having the following structure:

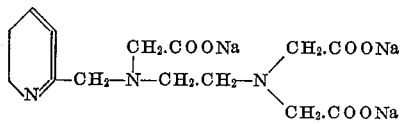

8. A pyridyl alkylene polyamine poly acid compound having the following structure:

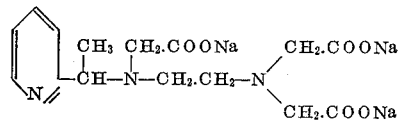

No references cited.